Patented Aug. 2, 1949

2,478,166

UNITED STATES PATENT OFFICE 2,478,166

PROCESS FOR REMOVING CARBON MONOXIDE FROM AIR AND GAS MASK CANISTER THEREFOR

Jan Hendrik de Boer, London, and Johannes van Ormondt, Northwood, England, assignors to the Minister of Supply in His Majesty's Government of the United Kingdom of Great Britain and Northern Ireland, London, England No Drawing. Application September 29, 1942, Serial No. 460,110. In Great Britain August 25, 1941

Section 1, Public Law 690, August 8, 1946
Patent expires August 25, 1961

5 Claims. (Cl. 23—4)

This invention relates to the oxidation or the removal of carbon monoxide in gases or vapours and to a reagent for effecting such oxidation or removal and has as its main object to provide a process of removing carbon monoxide which is suitable for use in gas purifiers such as the canisters of gas masks, or which can otherwise be employed for the removal of carbon monoxide for example in coal mines or garages, for fire fighting apparatus or in chemical analysis.

In the improved process of oxidising or removing carbon monoxide from gases or vapours according to this invention, the carbon monoxide is brought into contact with a mixture or compound containing a silver oxide, the silver being, wholly or partly, in divalent or multi-valent form. The silver oxide may comprise a mixture or compound containing $Ag_3O_4$ or may comprise a mixture or compound containing AgO.

The compound $Ag_3O_4$ cannot be obtained without a silver salt combined with it, the silver of this silver salt being again wholly or partially in a multi-valent form. If, for instance, $Ag_3O_4$ is prepared by means of a persulphate, as will be described hereinafter, it contains a certain amount of $AgSO_4$, the sulphate of divalent silver, and the formula may be written as $(Ag_3O_4)_a \cdot AgSO_4$, where "$a$" may have a value between 2 and 2.5. This compound, $(Ag_3O_4)_a \cdot AgSO_4$, reacts readily with carbon monoxide but not quite rapidly enough for normal gas mask canisters. Thus, the term "multi-valent" as used throughout this specification and the accompanying claims to describe the state of oxidation of the pertinent silver compounds is to be understood to connote silver having a valency greater than 1, i. e., 2 or more. It is also somewhat unstable in the presence of water vapour, being converted into AgO and the sulphate $Ag_2SO_4$ with the evolution of oxygen. The dry compound is, however, quite stable. The stability of the compound $(Ag_3O_4)_a \cdot AgSO_4$ can be very greatly improved by the addition of a metal, preferably cadmium, to the sulphate part of the compound, the combined cadmium-divalent-silver sulphate being, apparently, in the form of a solid solution.

The compound AgO, which may be called argentic oxide, is much more stable than the $Ag_3O_4$-compounds both as regards the action of heat and in the presence of water vapour. It reacts with carbon monoxide to produce metallic silver and carbon dioxide, the reaction, which probably takes place in stages, being, however, too slow for normal gas mask canisters. The reaction can be considerably accelerated, at some sacrifice of the stability in the presence of water, by the addition of one or more accelerating metals, such as manganese, copper, or cobalt to the argentic oxide (AgO), the first of these metals being particularly suitable. Thus the addition of manganese, probably in the form of manganese oxide (MnO), in solid solution with AgO increases the reaction between the argentic oxide (AgO) and carbon monoxide most and decreases the stability in the presence of water vapour least whilst the addition of cobalt increases the reaction least and decreases the stability most.

For certain of the purposes mentioned at the outset, for example when used in gas mask canisters, it is essential that the flow resistance of the silver oxide-containing mixture or compound to the gases or vapours passing therethrough should be as low as possible while maintaining a high gas throughput rate.

It has been ascertained that this condition can be fulfilled by imparting to the silver oxide-containing mixture or compound a porous but dense and compact form whereby thorough penetration of the reacting solid silver oxide with the carbon monoxide can take place and the whole mass of silver oxide enter into reaction easily.

The powders are readily taken up by asbestos fibres by stirring the asbestos into an aqueous slurry of the compound. It is possible to fix 20 grammes of the compound on one gramme of asbestos, but in practice 15 grammes of compound is used to one gramme of asbestos. The deposit on the asbestos will act as a smoke filter in addition to removing the carbon monoxide from a gas passed through it.

If the AgO-containing asbestos thus obtained has too high a resistance to the gas flow, it may be mixed with a more elastic fibrous material, such as glass wool, or a mixture of asbestos and glass wool, for example in the proportion of 1:5 or 1:10 may be used to take up the silver compound.

A better method of reducing the gas-flow resistance of the AgO-containing asbestos according to the invention is to form aggregates such as pellets or cubes therefrom by moulding it, preferably when wet, into the desired shape and drying it. The AgO-containing asbestos may for example be formed into a cake and cut into small cubes which after drying are adapted to be packed relatively tightly in the reaction zone without offering a high resistance to the flow of gases or vapours therethrough.

A preferred method of producing the aforesaid aggregates is to stir short asbestos fibres together with an aqueous suspension or slurry of the silver oxide-containing mixture, the resulting mass being filtered at the pump or through a filter press, moulded or extruded into rods which are dried and then cut into uniform shapes.

Although short-fibre asbestos is the preferred binder, other materials such as kieselguhr, clay, water glass or the like may also be employed.

The term "asbestos" employed herein is to be understood as comprising not only asbestos proper, but allied magnesium silicates such as serpentine and olivine.

The invention may be carried into practice in various ways and the preparation of several suitable forms of silver containing compounds which constitute features of the invention will now be described by way of example.

EXAMPLE 1

The compound $(Ag_3O_4)_a \cdot AgSO_4$ (hereinafter referred to as the $Ag_3O_4$ compound) may be prepared in the following manner: 100 grammes of potassium persulphate ($K_2S_2O_8$) are added to 1000 c. c. of distilled water at room temperature (about 20° C.) and, since the persulphate does not dissolve completely under these conditions, the mixture is stirred mechanically during the further addition of a solution consisting of 60 grammes of silver nitrate in about 300 c. c. of water. In order to accelerate the subsequent oxidation, the silver nitrate solution may be heated up to its boiling point before it is added but the temperature of the final mixture should preferably not exceed between 30 and 35° C. On the addition of the silver nitrate a black precipitate is formed. At first the precipitate is formed rapidly but as the amount formed increases for some time, the mixture is mechanically stirred for at least half an hour and preferably for about two hours. The mixture is allowed to settle for about two hours and then washed with water by decantation. After washing the precipitate is filtered at the pump, treated with acetone in order that it can be dried as quickly as possible, and dried in a desiccator. The yield with the quantities specified above is about 40 grammes of dry powder having the composition

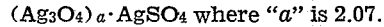

$(Ag_3O_4)_a \cdot AgSO_4$ where "$a$" is 2.07.

The specific quantities, temperatures and concentrations set forth above may be varied within quite wide limits. Thus, for example, by the use of a greater quantity of water the potassium persulfate may be completely dissolved before the silver nitrate solution is added.

The product will remain stable if kept in an absolutely dry atmosphere but decomposes into an intimate mixture of AgO and $Ag_2SO_4$ in a moist atmosphere, the greater the relative humidity and the higher the temperature, the more rapid the decomposition. The compound reacts with carbon monoxide, the $Ag_3O_4$ oxide being converted to $Ag_2O$.

EXAMPLE 2

A compound $(Ag_3O_4)_a AgSO_4$ containing cadmium is prepared by first adding a solution of 200 grammes of cadmium nitrate $(Cd(NO_3)_2.4H_2O)$ in 500 c. c. of water to a solution of 60 grammes of potassium persulphate ($K_2S_2O_8$) in 3000 c. c. of water. A solution of 20 grammes of silver nitrate ($AgNO_3$) in 500 c. c. of water is then added to the mixed solution. The black precipitate, after being allowed to form for about 4 hours at room temperature, is washed by decantation, treated with acetone and dried in an evacuated desiccator.

The product prepared in this way is found, on analysis, to contain 0.4% cadmium oxide (CdO). This cadmium oxide is contained in the sulphate part of the compound since it is found that if the compound is treated with hot or cold water for sufficient time to decompose it completely into AgO and $Ag_2SO_4$ (which goes into solution), the residual AgO is free from cadmium which has dissolved as cadmium sulphate with the $Ag_2SO_4$. It would appear that the cadmium enters into the compound as $CdSO_4$ in solid solution with the $AgSO_4$ part thereof.

This product is much more stable in the presence of water vapour than the pure, cadmium free $Ag_3O_4$-compound. Thus whilst the compound described in Example 1 shows a decrease in its "active" oxygen content of about 0.5% per day in an atmosphere of 77% relative humidity at a room temperature of about 20° C., the cadmium-containing compound described above shows an "active" oxygen decrease of about 0.04% per day.

The stability in the presence of water vapour may be varied by varying the amount of cadmium nitrate used in the preparation of the compound, a considerable excess of cadmium nitrate always being necessary in order to get a desired amount of cadmium into the compound. Thus if the proportion of cadmium nitrate to silver nitrate, which in the example given above is 10:1, is increased, for example, to 30:1 the compound obtained will only lose about 0.012% per day of its "active" oxygen in an atmosphere of 77% relative humidity at 20° C. Whilst if the ratio of cadmium nitrate to silver nitrate is reduced to 2:1, the rate of decomposition is about 0.25% of "active" oxygen per day.

These compounds containing cadmium whilst much more stable than the pure compound (a compound prepared by using cadmium nitrate and silver nitrate in the proportions of 30:1 may have, in an atmosphere of 80% relative humidity at 20° C., a half-life period of about one year), react with carbon monoxide more slowly than the cadmium-free compound.

EXAMPLE 3

Argentic oxide (AgO) may be prepared by decomposition of the $Ag_3O_4$-compound described in Example 1 and removal of the $Ag_2SO_4$ formed. Thus 19 grammes of the dry $Ag_3O_4$-compound will produce 11.7 grammes of AgO. The treatment comprises boiling the $Ag_3O_4$-compound in 500 c. c. of water for 5 minutes, allowing the compound to settle and removing the liquid whilst still hot by decantation, this process being repeated three times after which the product is sucked off and dried in air or by heating up to about 100° C.

If desired the $Ag_3O_4$-compound may be decomposed in cold water instead of by boiling but in this case the reaction takes several days. Alternatively the compound may be allowed to decompose in a moist atmosphere the product being extracted with either hot or cold water.

An alternative and preferable method of preparing argentic oxide (AgO) is by an alkaline treatment which comprises, for example, heating 1500 c. c. of water to 85° C., adding 100 c. c. of 15 N. NaOH solution, and then stirring in mechanically 80 grammes of potassium persulphate ($K_2S_2O_8$). A solution consisting of 50 grams of silver nitrate ($AgNO_3$) in about 200 c. c. of water and at a temperature of 85° C. is added and the stirring and heating is continued for about 15 minutes. The black precipitate which is formed is allowed to settle and then washed by decantation. In this method the theoretical amount of AgO can be obtained. If desired sodium (but not ammonium) persulphate can be used instead of potassium persulphate. The concentrations of the reagents used is not critical.

The argentic oxide (AgO) is relatively stable in the presence of water vapour losing about .001% of its active oxygen per day and, as stated above, it reacts with carbon monoxide to produce metallic silver and carbon dioxide.

EXAMPLE 4

A cobalt-containing AgO can best be prepared from a cobalt-containing $Ag_3O_4$-compound which is very unstable. Thus 0.12 gramme of cobalt-nitrate ($Co(NO_3)_2.6H_2O$) dissolved in a few c. c. of water is added to a solution of 90 grammes of potassium persulphate ($K_2S_2O_8$) in 3000 c. c. of water and then a solution containing 34 grammes of silver nitrate ($AgNO_3$) is added. The reaction is allowed to continue for several hours and then the precipitate is freed from the mother liquor by decantation or, if this is impossible owing to the violent development of oxygen, the precipitate is sucked off. The product is treated with cold water for one or two days and then sucked off. 12.7 grammes of AgO containing 0.2% by weight of CoO are obtained.

Heating of the mixture or solution during any stage of the process will cause partial decomposition of the final product. If a greater quantity of cobalt is used, the duration of the treatment with cold water can be decreased and vice versa.

EXAMPLE 5

An argentic oxide (AgO) containing manganese can be prepared either from the $Ag_3O_4$-compound or by direct oxidation under alkaline conditions.

In the first of these two methods a solution of 90 grammes of potassium persulphate ($K_2S_2O_8$) in 3000 c. c. of water has added to it first 6 c. c. of ¼ molar manganese sulphate solution and then a solution of 51 grammes of silver nitrate ($AgNO_3$) in 200 c. c. of water. The solution becomes dark violet in colour as, in addition to the formation of the $Ag_3O_4$-compound, part of the manganese is oxidised to permanganate. After allowing the reaction to continue for about 4 hours at room temperature, the product is washed by decantation, filtered at the pump and dried in a desiccator.

The 27 grammes of the product thus obtained is stored in an atmosphere of nearly 100% relative humidity for 8 days. The decomposition is such that at the beginning the loss of the "active" oxygen is at the rate of about 0.85% per day. When the decomposition is complete, the mass is extracted with water in order to free it from the silver sulphate formed. This extraction may be done with hot water but this entails a small loss of the "active" oxygen of the manganese-containing argentic oxide (AgO). The final product contains about 0.15% by weight of MnO.

In the second method a mixed solution of silver and manganese nitrates is formed by adding 40 c. c. of ¼ molar manganese nitrate solution to a solution of 102 grammes of silver nitrate in 200 c. c. of water. A persulphate solution is prepared by heating 2000 c. c. of water to 85° C. and adding first 150 c. c. of a 15N caustic soda (NaOH) solution and then 150 grammes of potassium persulphate ($K_2S_2O_8$). The persulphate solution is stirred mechanically whilst the mixed nitrates solution is added, the stirring being continued and the solution being heated for about 15 minutes. The product, which is washed by decantation, sucked off and dried, in air, comprises 74 grammes of argentic oxide (AgO) containing about 0.50% by weight of the MnO. In this case also part of the manganese is oxidised to permanganate. The percentage of manganese in the final product depends on the amount of manganese added to the solution, the concentration, the amount of alkali and the other variable factors.

The argentic oxide (AgO) containing some tenths of 1%, for example 0.20% or 0.80%, of manganese oxide, calculated on the assumption that the oxide is MnO, reacts very readily with carbon monoxide and will immediately remove the carbon monoxide even from a wet gas mixture. The argentic oxide containing 0.20% of MnO loses in an atmosphere of 80% relative humidity at 20° C., 0.003% of its "active" oxygen per day, the original "active" oxygen content being about 6.3%. Thus the half-life period is more than 1000 days.

As a result of the loss of "active" oxygen, part of the silver of the argentic oxide is converted into the monovalent state. In all the cases mentioned above, the monovalent silver produced during the decomposition forms solid solutions with the argentic oxide. In most cases the partially decomposed products have substantially the same speed of reaction with carbon monoxide as the undecomposed products.

It has been found that the addition of more than one of the accelerating metals may be advantageous. Thus, for example, the addition of 0.1% of CuO and 0.15% of MnO results in a product which reacts more readily with carbon monoxide than does an argentic oxide containing either 0.1% or 0.25% of CuO or 0.1% or 0.25% of MnO.

EXAMPLE 6

To 2 litres of distilled water at 85° C. which is kept heated and mechanically stirred, there are added the following; first a concentrated solution of caustic soda containing 144 grs. NaOH, then a solution containing 150 grs. potassium persulphate, after which a solution containing 102 grs. silver nitrate and 3.6 grs. manganese nitrate, $Mn(NO_3)_2 6H_2O$, is slowly added. Heating is continued until the temperature reaches 90° C. and is then discontinued, but the stirring of the resultant suspension of silver oxide is continued for a further 15 minutes.

As in the foregoing example, the liquid is dark violet in colour and the precipitate is washed by decantation until the liquid is colourless, the yield (calculated on Ag) being quantitative. The manganese content (which is 0.5% MnO in the present instance) depends on the working temperature and the concentration of the reagents but the maximum reactivity towards carbon monoxide is reached at the foregoing manganese oxide percentage and only falls off gradually as said percentage is either increased or decreased, so that the efficiency is not seriously affected thereby.

The manganese activated silver oxide is suspended in water and short fibred asbestos stirred thereinto, the proportions taken being 1 part asbestos to 15 parts silver oxide. The asbestos turns quite black and after gentle stirring for some time, takes up all the silver oxide. The suspension is then filtered on a Buchner funnel, and the filter cake is cut into strips, formed into square bars, dried and finally cut into cubes of 3 mm. edge.

This material can be packed into containers, such as for example the Service respirator canister with a density as high as 1.45 grs./c. c. and at the same time the gas-flow resistance is less than 3" water gauge (at normal respiratory flow).

The following Tables No. 1 and 2 set forth the results of tests of the efficiency of the foregoing silver oxide-asbestos cubes in removing carbon monoxide from air of 70% relative humidity containing 1% CO.

TABLE I

*Tube test*

The cubes were packed into a tube 3.5 cms. in diameter, the depth of bed being 8.0 cms. and the density of packing 1.5 grs./c. c. The flow rate of the air current passing through was 4 1/min.

| Time | Efficiency of Removal |
|---|---|
| Minutes | Per cent |
| 0-3 | 99-100 |
| 3-160 | 100 |

Test stopped and material allowed to cool.
After restarting:

| Time | Efficiency of Removal |
|---|---|
| Minutes | Per cent |
| 0-5 | 98-100 |
| 5-120 | 100 |

Test stopped and material allowed to cool.
After restarting:

| Time | Efficiency of Removal |
|---|---|
| Minutes | Per cent |
| 0-5 | 85-99 |
| 5-41 | 99 |
| 40-120 | 99-90 |

Total service time: 400 mins. to 90% removal.

This test shows that after a short time lag (3-5 mins.) 100% removal was affected for several hours, the total service time to 90% removal being of the order 6½ hours. Stopping the test and allowing the bed to cool introduced a further time lag before maximum efficiency of removal was attained on restarting.

TABLE II

*Container test*

This test was performed in a service respirator canister at normal respiratory flow, the depth of bed being 8.0 cms. and the density of packing 1.25/grs./c. c. Resistance of the bed 2.2" water gauge.

| Time | Efficiency of Removal | Temp. at neck of container, °C. |
|---|---|---|
| Minutes | Per cent | |
| 0-15 | 80-99 | 17-35 |
| 15-30 | 99-100 | 35-70 |
| 30-450 | 100 | 90-100 |

Test stopped, container allowed to cool.
After restarting:

| Time | Efficiency of Removal | Temp. at neck of container, °C. |
|---|---|---|
| Minutes | Per cent | |
| 0-20 | 70-90 | 18-70 |
| 20-90 | 90 | 85 |
| 90-120 | 90-85 | 80 |

Total service time: 540 mins. to 90% removal.

We claim:

1. A process for removing carbon monoxide from an air stream containing the carbon monoxide as a contaminant in an amount about 1%, which comprises contacting the air stream with a gas contact mass comprising an oxide of silver in an amount sufficient to effect said CO removal, the silver in said silver oxide having a valence greater than 1.

2. A process for removing carbon monoxide from an air stream containing the carbon monoxide as a contaminant in an amount about 1% which comprises contacting the air stream with a gas contact mass comprising an oxide of silver in an amount sufficient to effect said CO removal, the silver in said silver oxide having a valence of 2.

3. A process for removing carbon monoxide from an air stream containing the carbon monoxide as a contaminant in an amount about 1% which comprises contacting the air stream with a gas contact mass containing argentic oxide in an amount sufficient to effect said CO removal.

4. A gas-mask canister in which the gas treatment portion of the canister consists of a porous, dense, compact mass of cubes of substantially uniform size formed from a silver oxide, the silver in said oxide having a valence greater than one, mixed short-fibre asbestos in the proportion of about 15 parts silver oxide to about 1 part asbestos, said porous mass having a gas flow resistance less than 3" water-gauge.

5. A gas-mask canister in which the gas treatment portion of the canister consists of a porous, dense, compact mass of cubes of substantially uniform size formed from argentic oxide containing about 0.5 per cent manganese oxide mixed with short-fibre asbestos in the proportion of about 15 parts argentic oxide to about 1 part asbestos, said porous mass having a gas flow resistance less than 3" water-gauge.

JAN HENDRIK DE BOER.
JOHANNES VAN ORMONDT.

(References on following page)

REFERENCES CITED

The following references are of record in the file of this patent:

UNITED STATES PATENTS

| Number | Name | Date |
|---|---|---|
| 1,345,323 | Frazer | June 29, 1920 |
| 1,422,211 | Lamb | July 11, 1922 |
| 1,519,470 | Wilson | Dec. 16, 1924 |

FOREIGN PATENTS

| Number | Country | Date |
|---|---|---|
| 1,309 | Austria | Apr. 6, 1926 |
| 28,404 | Great Britain | 1911 |
| 413,744 | Great Britain | July 26, 1934 |
| 436,906 | Great Britain | Oct. 21, 1935 |

OTHER REFERENCES

Mellor, Inorganic and Theoretical Chemistry, Longmans 1923, vol. III, pp. 374, 383-4, 482-5.

Thorpe, Dictionary of Applied Chemistry, Longmans 1916, vol. IV, page 700.